United States Patent [19]
Tanaka

[11] Patent Number: 5,523,835
[45] Date of Patent: Jun. 4, 1996

[54] DISTANCE MEASURING EQUIPMENT

[75] Inventor: Syoichi Tanaka, Himeji, Japan

[73] Assignee: Mitsubishi Denki Kabushiki Kaisha, Tokyo, Japan

[21] Appl. No.: 202,005

[22] Filed: Feb. 25, 1994

[30]   Foreign Application Priority Data

Mar. 2, 1993   [JP]   Japan .................................. 5-041027

[51] Int. Cl.⁶ ...................................................... G01C 3/08
[52] U.S. Cl. ........................ 356/5.05; 342/134; 356/5.01
[58] Field of Search ................................ 356/5.01–5.08; 342/134, 135

[56]   References Cited

U.S. PATENT DOCUMENTS 4,322,832   4/1982   Sartorius .
  4,344,705   8/1982   Kompa et al. .
  4,505,582   3/1985   Zuleeg et al. .
  4,699,508   10/1987  Bölkow et al. .
  4,717,252   1/1988   Halldorsson et al. .
  4,734,587   7/1988   Schwarte .
  4,849,644   5/1989   Mira et al. .
  5,054,911   10/1991  Ohishi et al. .
  5,179,286   1/1993   Akasu .
  5,359,404   10/1994  Dunne .

FOREIGN PATENT DOCUMENTS

0269902   8/1988   European Pat. Off. .

*Primary Examiner*—Stephen C. Buczinski
*Attorney, Agent, or Firm*—Sughrue, Mion, Zinn, Macpeak & Seas

[57]   ABSTRACT

Disclosed is a distance measuring equipment comprising: a light emitting element for generating a pulse beam; and a light receiving element for receiving a reflected pulse beam from an object under measurement with respect to the pulse beam generated from the light emitting element and converting the reflected pulse beam into an electric light receiving signal. The distance measuring equipment also comprises: an object detecting element for detecting the under-measurement object on the basis of a level of an output signal of the light receiving signal through the light receiving element; and a calculating element for calculating, when the object detecting element detects the under-measurement object, a distance to the under-measurement object on the basis of a time obtained by subtracting a predetermined time corresponding to a half-value of a pulse width of the light receiving signal from a delay time from a generation of the pulse beam through the light emitting element to a reach of a peak of the light receiving signal through the light receiving element.

6 Claims, 8 Drawing Sheets

DISTANCE MEASURING EQUIPMENT

BACKGROUND OF THE INVENTION

1. Field of the Invention

The present invention relates to a distance measuring equipment for obtaining a distance to an object by irradiating the object with a pulse beam, receiving the pulse beam reflected from the object and thus measuring a time spent from the irradiation and the reception thereof.

2. Related Background Art

Figure 7:
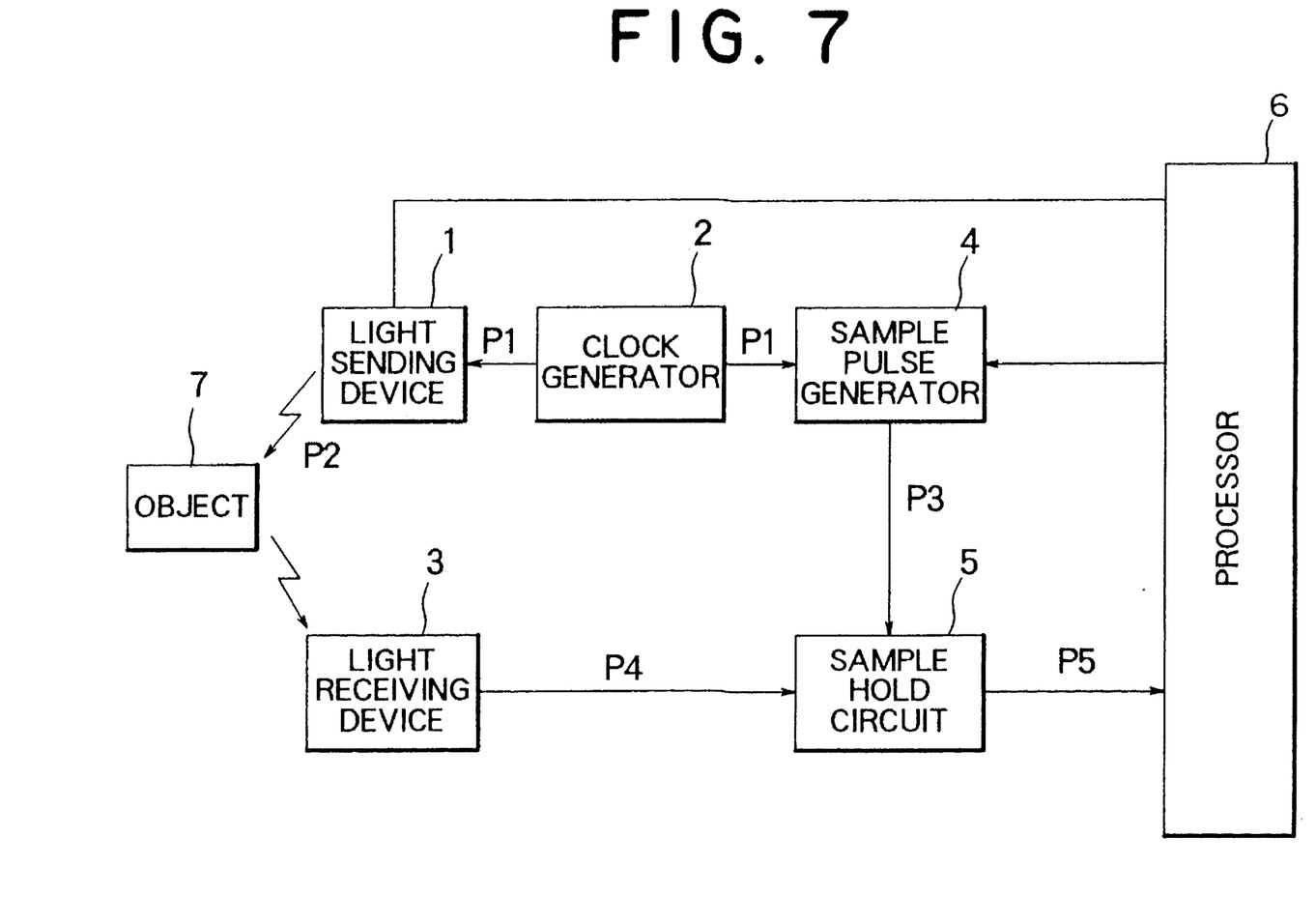
FIG. 7 is a block diagram illustrating a conventional distance measuring equipment.

This type of known distance measuring equipment is an optical radar system as disclosed in, e.g., Japanese Patent Laid-Open Publication No. 2-228579. FIG. 7 is a diagram illustrating a construction of a conventional distance measuring equipment. A light sending device 1 generates a pulse beam P2 by actuating a light emitting element such as a laser diode, etc. A clock generator 2, which has its output side connected to an input side of the light sending device 1, generates a clock pulse P1 serving as a generation timing for the pulse beam P2. The light sending device 1 inputs the clock pulse P1. A light receiving device 3 receives the pulse beam reflected from the object 7 irradiated with the pulse beam P2. The light receiving device 3 converts the pulse beam into an electric signal P4. A sample pulse generator 4, which has its input side connected to the other output side of the clock generator 2, counts the clock pulses P1 inputted from the clock generator 2. The sample pulse generator 4, at the same time, generates a sample pulse P3. A sample hold circuit 5 is connected to an output side of the light receiving device 3 and to an output side of the sample pulse generator 4. The sample hold circuit 5 performs sampling of the output signals P4 of the light receiving device 3 by use of the sample pulses P3 of the sample pulse generator 4. A processor 6 is connected to output sides of the sample pulse generator 4 and of the sample hold circuit 5. The processor 6 inputs a clock pulse count value from the sample pulse generator 4 and also an output signal from the sample hold circuit 5. The processor 6 thus detects a distance to the object 7.

Figure 8:
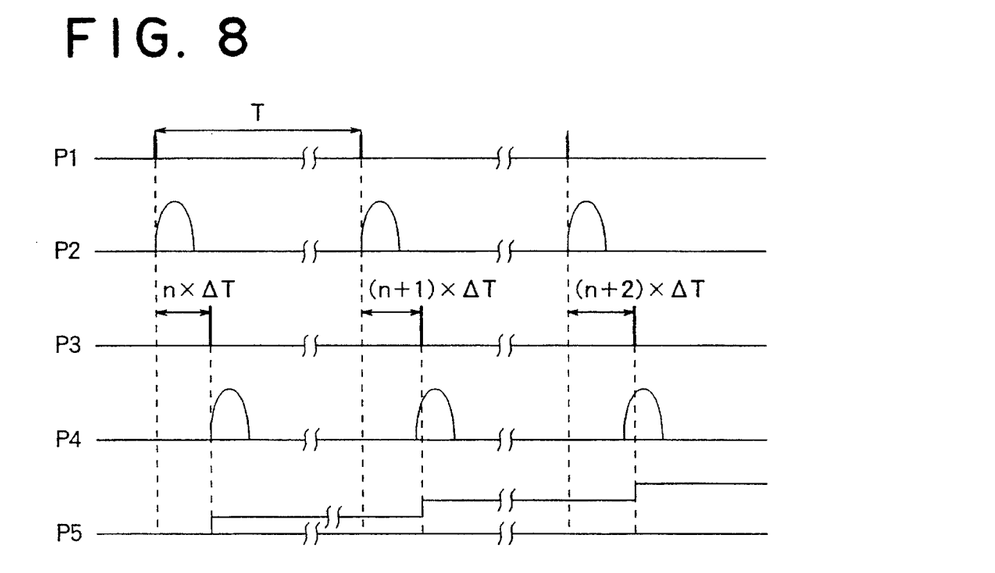
FIGS. 8 and 9 are timing charts each showing an operation of the equipment of FIG. 7.
Figure 9:
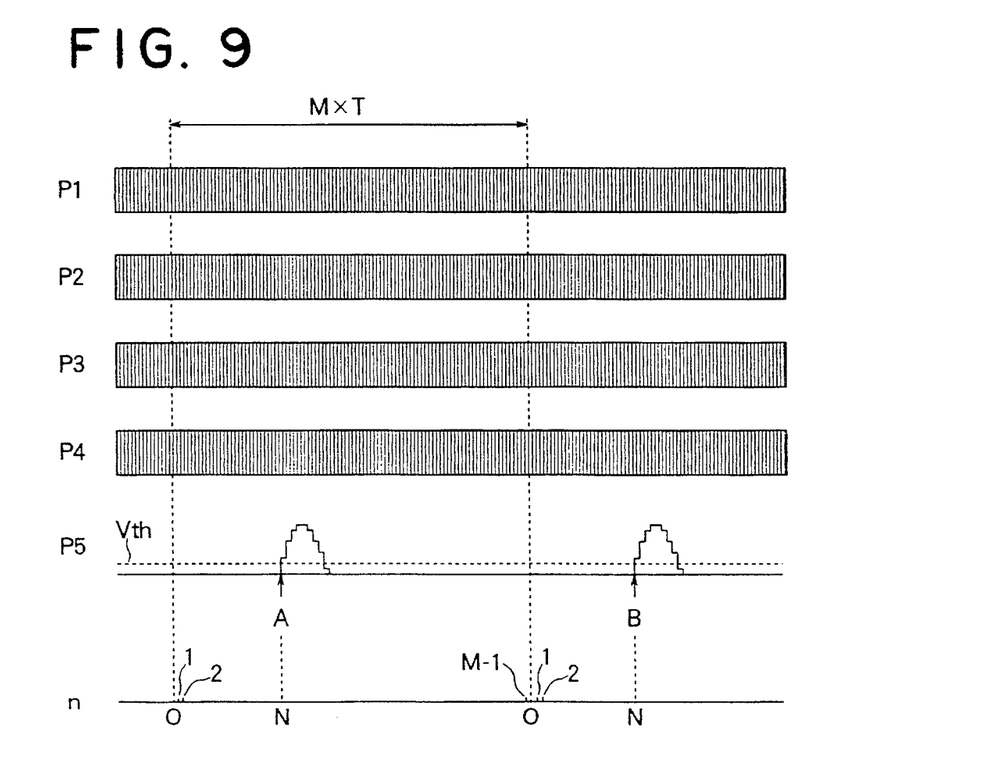

Next, an operation of the thus constructed conventional equipment will be explained with reference to FIGS. 8 and 9. FIG. 8 is a diagram illustrating operating waveforms within a clock pulse period of the clock generator 2. FIG. 9 is a diagram illustrating operating waveforms at a time interval when this distance measuring equipment measures the distance once. The clock generator 2 generates the clock pulse P1 at a time interval T longer than a time corresponding to the maximum measured distance. This clock pulse P1 is inputted to the light sending device 1. The light sending device 1 generates the pulse beam P2 in synchronism with this clock pulse P1. The light receiving device 3 receives this pulse beam P2 reflected from the object 7. The light receiving device 3 photoelectrically converts the reflected pulse beam into the electric signal and performs a high-frequency amplification thereof. The output signal P4 therefrom is inputted to the sample hold circuit 5. On the other hand, the sample pulse generator 4 counts the clock pulses P1 given from the clock generator 2. The sample pulse generator 4 repeats counting, wherein one period is a predetermined clock pulse count value M larger than a value obtained by dividing the maximum measured distance by a distance resolving power. At the same time, the sample pulse generator 4 generates a sample pulse P3 in which the clock pulse P1 is delayed by a time given by multiplying a minute time $\Delta T$ corresponding to the distance resolving power by a clock pulse count value n. The sample hold circuit 5 samples a pulse signal of the reflected beam with the above sample pulse P3. The sample hold circuit 5 holds a signal level thereof up to the next sample pulse P3. This held signal P5 is a signal in which a waveform of the high-frequency reflected pulse beam is frequency-converted into a low-frequency signal. The processor 6 compares the low-frequency output signal P5 of the sample hold circuit 5 with a threshold value Vth for detecting the reflected pulse beam and thus detects signals (A and B in FIG. 9) larger than the threshold value. A distance L between the distance measuring equipment and the object is obtained from a clock pulse count value N of the sample pulse generator 4 at this time in accordance with the following formula:

$$L = N \times \Delta T \times C/2 \qquad (1)$$

where C is the velocity of light. Namely, the distance L is ½ of a pulse beam travel obtained by multiplying a light emission-through-receipt time given from the clock pulse count value N by the light velocity C. The pulse count value N is, when the count value becomes a value corresponding to the maximum detected distance, reset to 0. The above actions are defined as a measuring one period, and the distance is continuously obtained with repetitions thereof.

Figure 10:
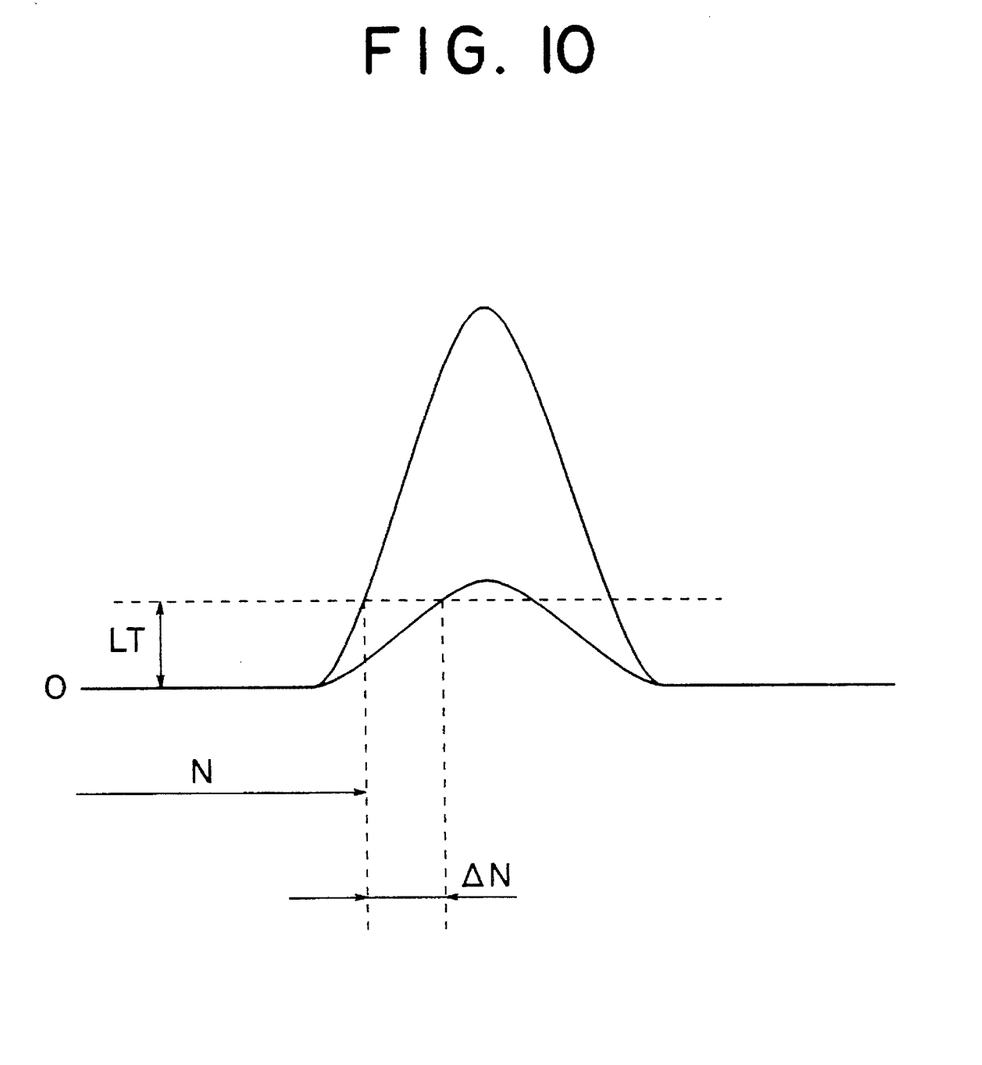
FIG. 10 is a diagram of a waveform, showing a problems inherent in the equipment of FIG. 7.

Problems inherent in this type of distance measuring equipment will be explained with reference to FIG. 10. A waveform shown in FIG. 10 indicates an output signal P5 of the sample hold circuit 5. The symbol LT designates a predetermined threshold value for detecting a reflected pulse beam. The processor 6 in the conventional equipment performs a detection by comparing, with the threshold value LT, a level of the light receiving signal with respect to the reflected pulse beam from the object. The processor 6 calculates a distance L by use of a count value N of the clock pulses P1 at that time. With this processing, as illustrated in FIG. 10, an error $\Delta N$ is produced in the count value N of the clock pulses P1, depending on a magnitude of the level of the light receiving signal. Consequently, the measured distance L has an error given by $\Delta N \times \Delta t \times C/2$. For this reason, if a reflectivity of the object 7 serving as an object for measurement is different, and even when existing at the same distance, an intensity of the reflected beam differs. For the reason given above, there arises a problem wherein a different distance L is to be measured, resulting in an error caused in the measured distance L. For example, this type of distance measuring equipment is mounted on a car. If the distance measuring equipment is utilized for a system for keeping a safe car-to-car distance by measuring a distance to a foregoing car, danger is present because the detected distance varies according to the type of the foregoing car. Namely, a measured distance error arises due to the reflectivity of the object, and becomes a serious problem which affects the safety and reliability of a system incorporating this type of equipment.

SUMMARY OF THE INVENTION

It is a primary object of the present invention, which has been devised to obviate the problems described above, to provide a distance measuring equipment capable of measuring a distance irrespective of a magnitude of a level of a reflected beam from an object with respect to a pulse beam generated from the distance measuring equipment.

To accomplish this object, according to one aspect of the present invention, there is provided a distance measuring equipment comprising: a light emitting element for generating a pulse beam; a light receiving element for receiving a reflected pulse beam from an object under measurement with respect to the pulse beam generated from the light emitting element and converting the reflected pulse beam into an electric light receiving signal; an object detecting element for detecting the under-measurement object on the basis of a level of an output signal of the light receiving signal through the light receiving element; and a calculating element for calculating, when the object detecting element detects the under-measurement object, a distance to the under-measurement object on the basis of a time obtained by subtracting a predetermined time corresponding to a half-value of a pulse width of the light receiving signal from a delay time from a generation of the pulse beam through the light emitting element to a reach of a peak of the light receiving signal through the light receiving element.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Figure 1:
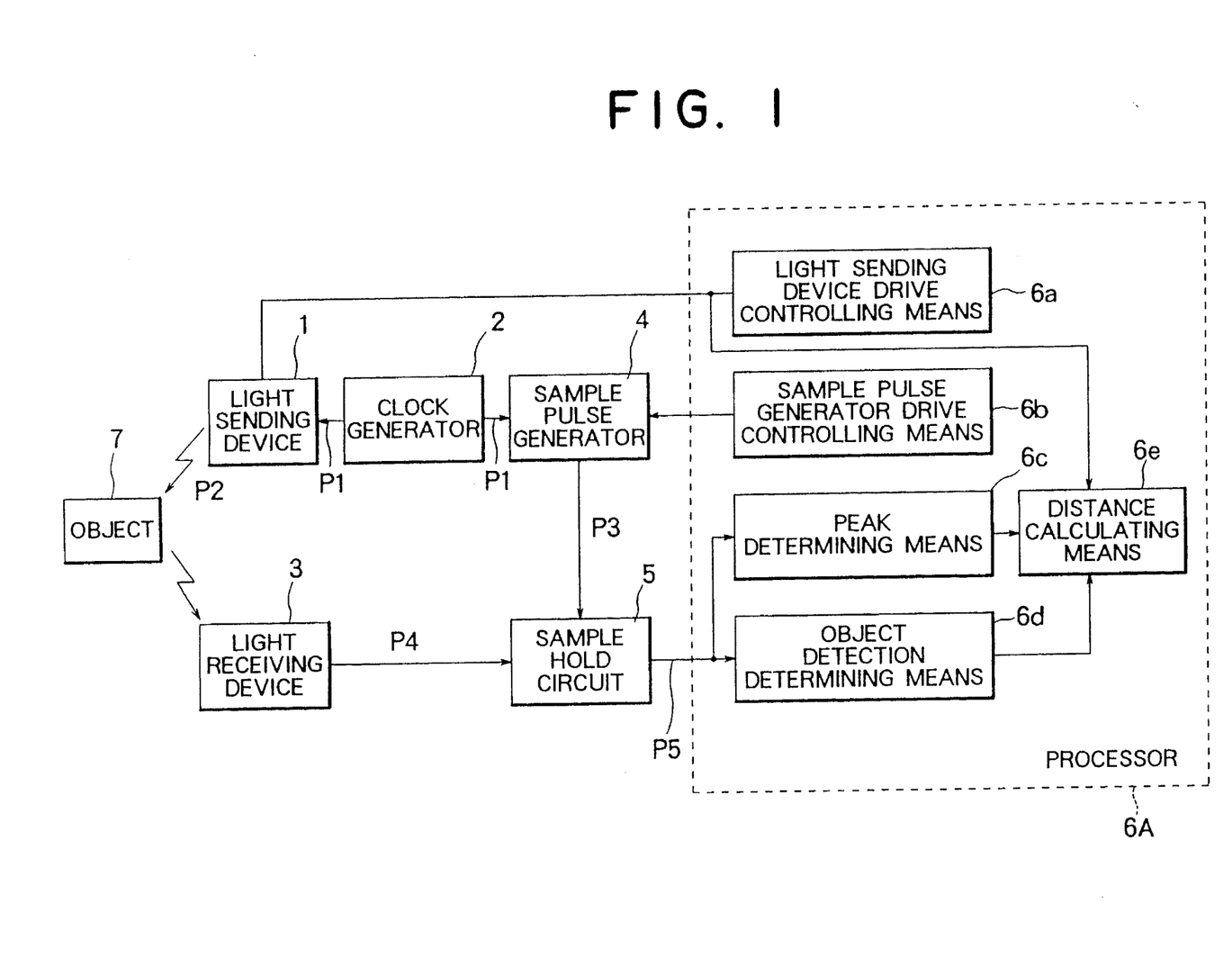
FIG. 1 is a block diagram illustrating a distance measuring equipment in accordance with an embodiment 1 of this invention.

An embodiment 1 of this invention will be explained with reference to the drawings. Turning to FIG. 1, a light sending device 1 generates a pulse beam P2 by actuating a light emitting element such as a laser diode, etc. A clock generator 2 connected to an input side of the light sending device 1 generates a clock pulse P1 serving as a pulse beam emitting timing of the light sending device 1. A light receiving device 3 is disposed in side-by-side relationship with the light sending device 1. A sample pulse generator 4 connected to the clock generator 2 counts the clock pulses P1 and generates a sample pulse P3 in which the above clock pulse P1 is delayed by a time interval corresponding to the count value thereof. A sample hold circuit 5 is connected to output sides of the sample pulse generator 4 and of the light receiving device 3. The sample hold circuit 5 performs sampling of the output signals P4 of the light receiving device 3 by use of the sample pulses P3 generated by the sample pulse generator 4. A processor 6A is connected to output sides of the sample pulse generator 4 and of the sample hold circuit 5. The processor 6A is, at the same time, connected to the light sending device 1. The processor 6A compares the output signal P5 of the sample hold circuit 5 with a predetermined level. The processor 6A thus detects an object 7 and calculates a distance thereto. This processor 6A comprises a light sending device drive controlling element 6a, a sample pulse generator drive controlling element 6b, a peak determining element 6c, an object detection determining element 6d and a distance calculating element 6e. The light sending device drive controlling element 6a connected to a light sending device 1 drive-controls the light sending device 1. The sample pulse generator drive controlling element 6b connected to a sample pulse generator 4 drive-controls the sample pulse generator. The peak determining element 6c connected to a sample hold circuit 5 determines a peak of a light receiving signal P4 on the basis of an output signal P5 from this sample hold circuit 5. The object detection determining element 6d connected to the sample hold circuit 5 determines a detection of an object by comparing a level of the light receiving signal P4 with a predetermined level LT on the basis of the output signal P5 from this sample hold circuit 5. The distance calculating element 6e is connected to this object detection determining element 6d and to the peak determining element 6c as well. The distance calculating element 6e is also connected to an output side of the light sending device drive controlling element 6a and obtains a distance to an object 7 for detection.

Next, operations of the thus configured embodiment 1 will be discussed. A clock generator 2 generates a clock pulse P1. The light sending device 1 emits a pulse beam P2 in synchronism therewith. This pulse beam P2 is reflected by the object 7 and received by a light receiving device 3. The light receiving device 3 photoelectrically converts this reflected pulse beam and thereafter high-frequency-amplifies the pulse beam. The light receiving device 3 then outputs an electric signal P4 to the sample hold circuit 5. On the other hand, the sample pulse generator 4 counts the clock pulses P1 given from the clock generator 2. The sample pulse generator 4 generates a sample pulse P3 delayed from the clock pulse P1 by a time given by multiplying a count value N thereof by Δt corresponding to a distance resolving power. The sample hold circuit 5 samples the light receiving signal P4 outputted from the light receiving device 3 by use of this sample pulse P3 and holds it up to a generation of the next sample pulse. The object detection determining element 6d in the processor 6A compares the output signal P5 from this sample hold circuit 5 with the threshold value LT for detecting the reflected pulse beam. The object detection determining element 6d determines a detection of the object 7 by detecting a signal larger than the threshold value LT.

Figure 2:
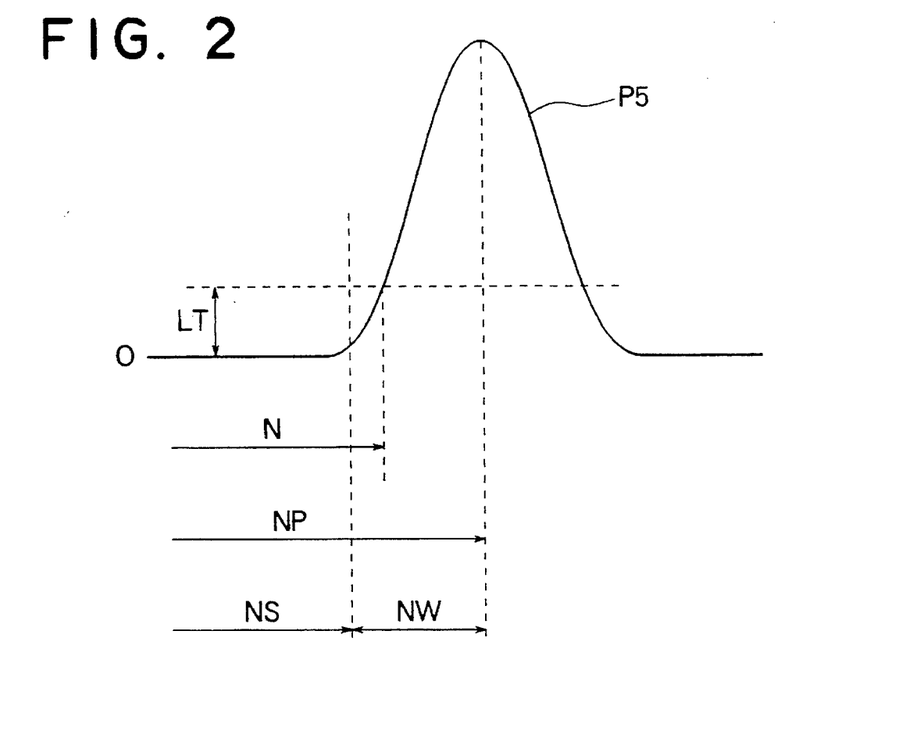
FIG. 2 is a diagram of a waveform, showing an operation of the embodiment 1.

Actions of the processor 6A after the detection will be explained with reference to FIG. 2. Note that a waveform shown in FIG. 2 indicates an output signal of the sample hold circuit 5, i.e., the light receiving signal P5. The symbol LT represents a threshold value for detecting the reflected pulse beam, and N designates a then-obtained clock pulse count value of the sample pulse generator 4. The peak determining element 6c in the processor 6A, after detecting the object 7, sequentially reads a level of the light receiving signal P5 in synchronism with the sample pulse P3 and thus searches a peak of the waveform. When detecting the peak, a detection signal is outputted to the distance calculating element 6e. This distance calculating element 6e obtains NS=NP−NW, which corresponds to a delay time up to a rise starting point of the light receiving signal PS. This is given by subtracting a count value NW corresponding to a half-value of a pulse width of the light receiving signal P5 from a count value NP of the clock pulses P1 at that time. This equation is substituted into the following formula (2) to obtain a distance L. The calculated distance L is outputted to the outside by means of the distance calculating element 6e.

$$L=NS \times \Delta t \times C/2 \qquad (2)$$

Note that the half-value of the pulse width of the light receiving signal P5 is obtained as a half-value of an emitted pulse length from the light sending device 1. The count value N of the clock pulses P1 is, when the count value N reaches a value corresponding to the maximum detected distance, reset to 0. The above operations are defined as a measuring one period, and the distance is continuously obtained with repetitions thereof.

Figure 3:
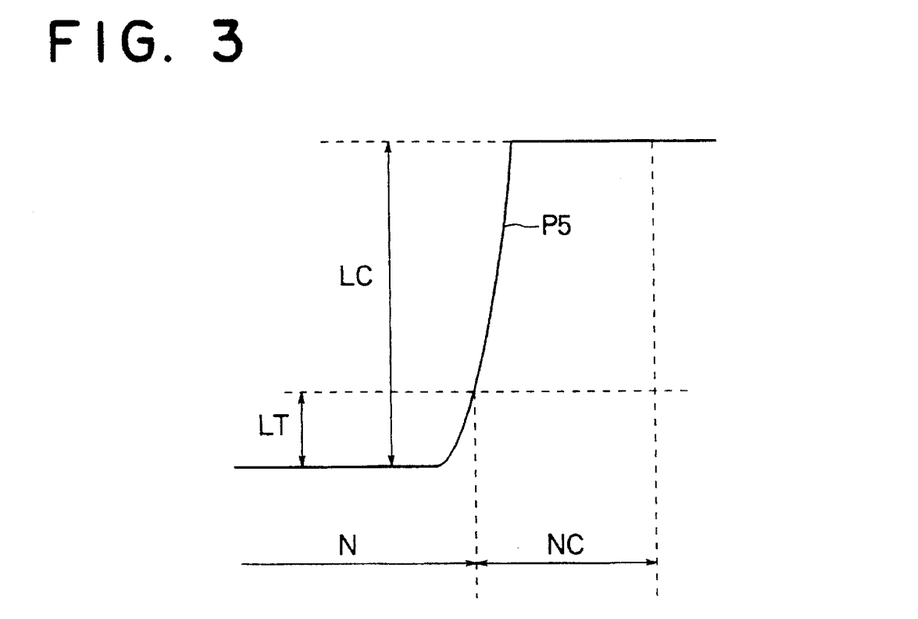
FIG. 3 is a diagram of a waveform, showing an operation of an embodiment 2.

Embodiment 2:

Given further is an explanation of a case where the peak is undetectable even by reading the level of the light receiving signal for a predetermined or longer time in the above-described embodiment 1 in conjunction with FIG. 3. As illustrated in the FIG. 3, when N is a count value of the clock pulses P1, the light receiving signal P5 larger than the threshold value LT is detected. Thereafter, however, the peak can not be detected even when the peak determining element 6c reads the light receiving signal P5 over a predetermined time corresponding to a count value NC. In this case, the light receiving device 3 receives an excessive input, and, therefore, the distance calculating element 6e determines that the light receiving signal P5 reaches a saturation level LC. An inclination of the light receiving signal P5 at that time is steep, and an error of measurement is small. On this assumption, the distance L is obtained by use of the count value N of the clock pulses P1 when detecting the light receiving signal. The distance can be thereby measured with a high accuracy even if the peak is undetectable.

Figure 4:
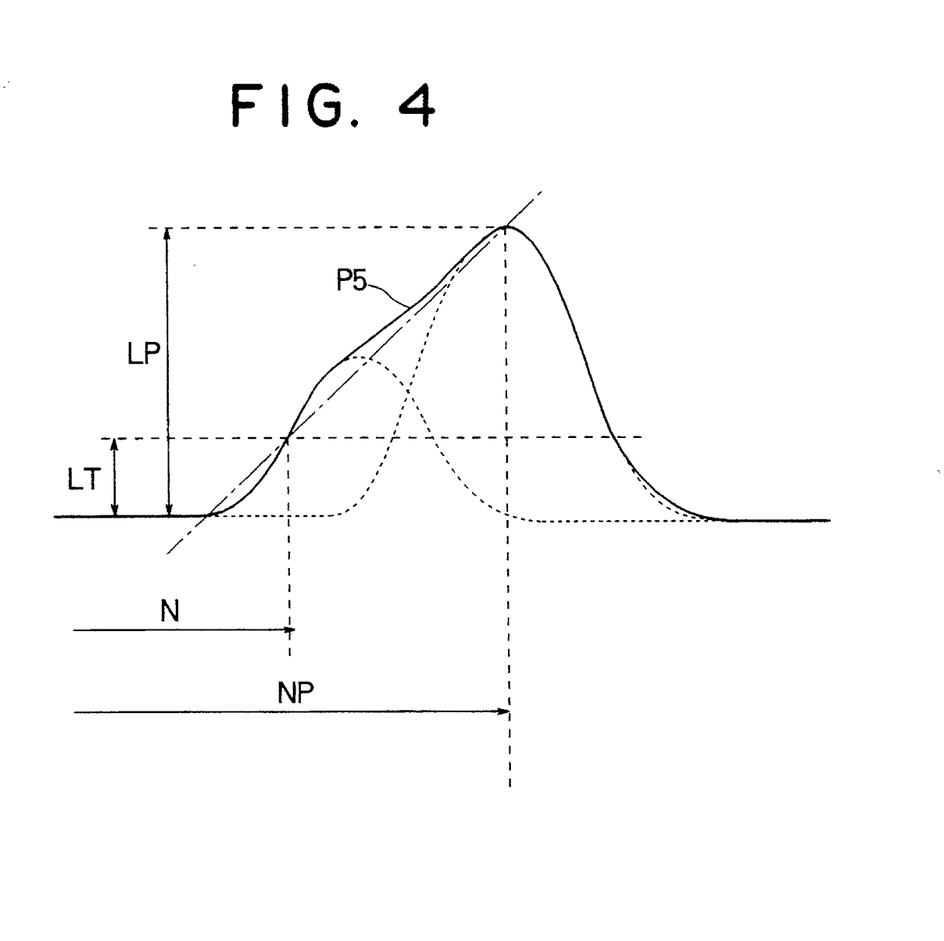
FIG. 4 is a diagram of a waveform, showing an operation of an embodiment 3.

Embodiment 3:

The following is an arrangement of this embodiment 3. In the embodiment 1 discussed above, the distance calculating element 6e calculates a distance L to the object 7 on the basis of a count value NS of the clock pulses P1. On the other hand, the distance calculating element 6e calculates an inclination K of the light receiving signal P5 from a rise over the detection level LT to a time when the peak is reached. As illustrated in FIG. 4, when the count value of the clock pulses P1 comes to N, the light receiving signal P5 larger than the threshold value LT is detected. When a count value NP of the clock pulses P1 becomes NP thereafter, the peak is detected. Here, this peak value is set as LP. Then, the inclination K of the light receiving signal P5 can be given by the following formula (3).

$$K=(LP-LT)/(NP-N) \qquad (3)$$

Next, when a plurality of objects exist, as shown in FIG. 4, this inclination K at this time is smaller than a predetermined value. Then, the distance calculating element 6e is capable of determining that the plurality of objects exist on the basis of output signals of the peak determining element 6c and of the object detection determining element 6d. This is done on condition that this inclination K is smaller than the predetermined value. Then, the measured distance L obtained from the count value NP of the clock pulses up to the peak is determined as an error at this time. The distance L is obtained by use of the count value N of the clock pulses P1 when detecting the light receiving signal.

Figure 5:
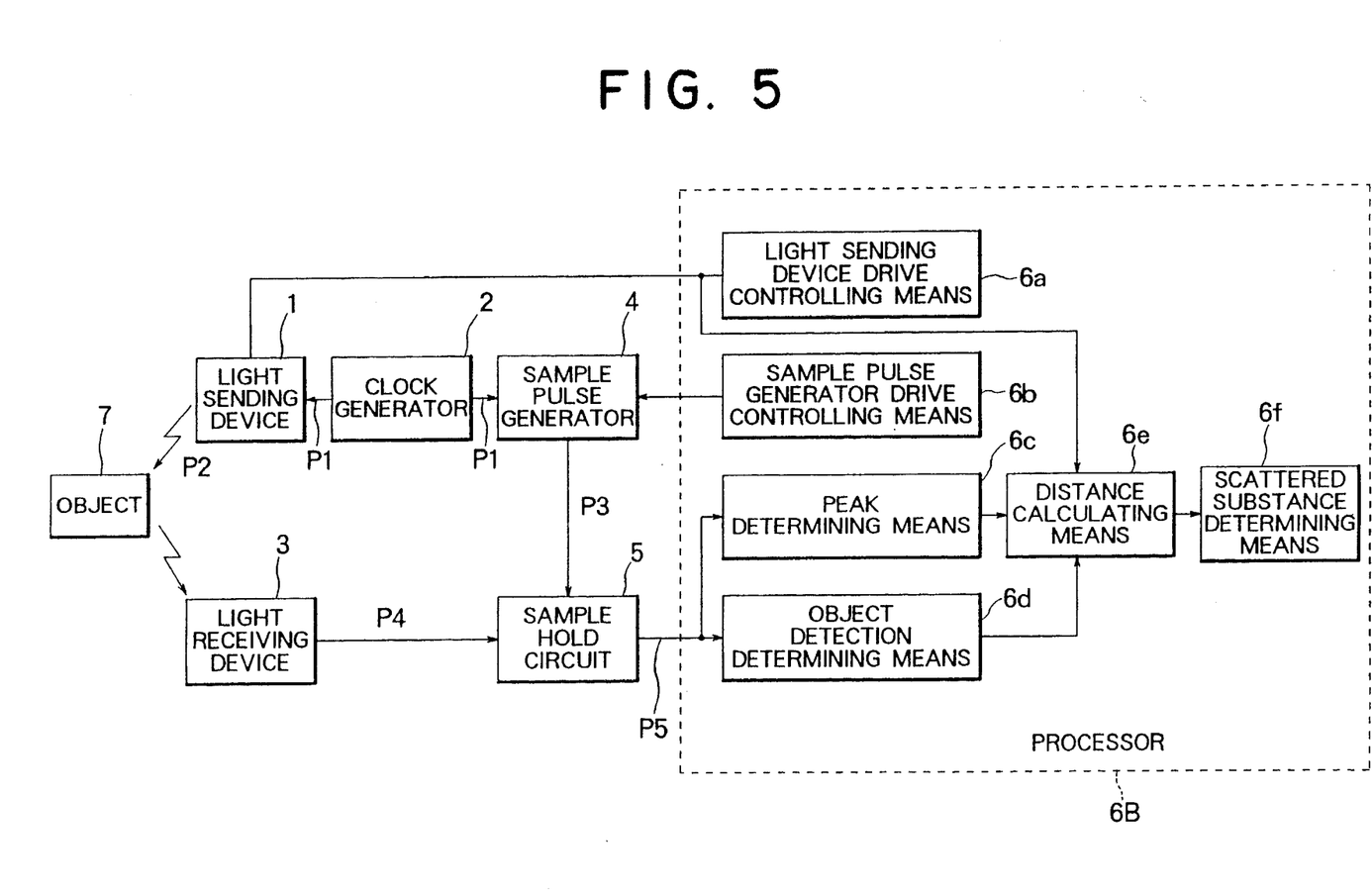
FIG. 5 is a block diagram illustrating the distance measuring equipment in an embodiment 4.

Embodiment 4:

FIG. 5 illustrates a distance measuring equipment of embodiment 4. In accordance with this embodiment 4, the processor 6A in the embodiment 1 is replaced with a processor 6B including a scattered substance determining element 6f connected to the distance calculating element 6e. The scatted substance determining element 6f compares a measured distance L calculated by the distance calculating element 6e with a predetermined value. If the measured distance L is smaller than the predetermined value, a level of the light receiving signal P5 does not reach the saturation level LC irrespective of a short distance. The scattered substance determining element 6f therefore determines that the object detected is related to a scattered substance such as a fog, etc. The scattered substance determining element 6f judges that the then-measured distance L is erroneous and outputs this result.

Note that the distance calculating element 6e may determine an existence and non-existence of the scattered substance without separately providing the scattered substance determining element 6f.

Figure 6:
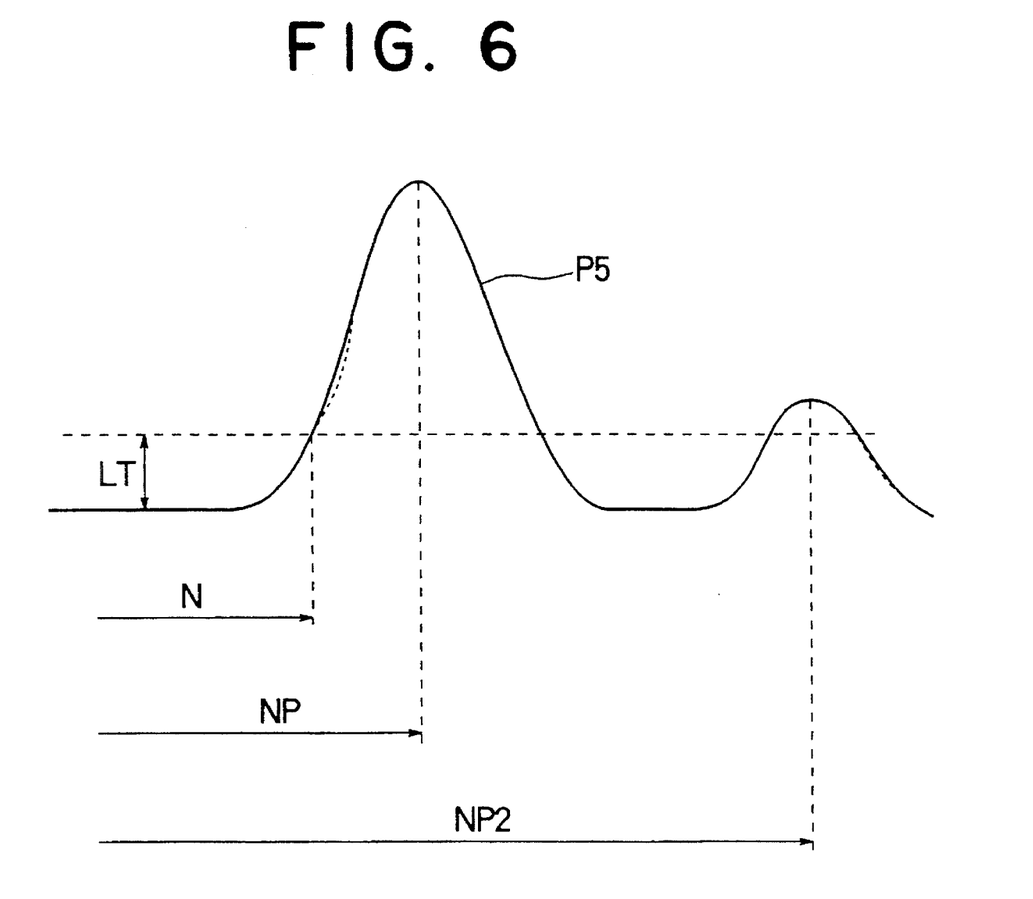
FIG. 6 is a diagram of a waveform, showing an operation of an embodiment 5.

Embodiment 5:

If the scattered substance determining element 6f determines that the detection is erroneous due to a scattered substance such as fog, etc. in the embodiment 4, the distance calculating element 6e detects the next peak of the light receiving signal P5, and the distance may be newly measured based on this peak. For instance, as illustrated in FIG. 6, the measurement based on the count value NP at the first peak detection after detecting the light receiving signal P5 is determined as an erroneous detection. In this case, the distance is to be measured based on a count value NP2 at the next peak detection. Then, if the distance calculated based on the count value NP2 is equal to or greater than a predetermined value, this measured distance is outputted as a correct value.

It is apparent that, in this invention, a wide range of different working modes can be formed based on the invention without deviating from the spirit and scope of the invention. This invention is not restricted by its specific working modes except being limited by the appended claims.

What is claimed is:

1. A distance measuring equipment comprising:

a light emitting means for generating a pulse beam;

a light receiving means for receiving a reflected pulse beam from an object under measurement with respect to the pulse beam generated from said light emitting means and converting the reflected pulse beam into an electric light receiving signal;

an object detecting means for detecting the under-measurement object on the basis of a level of an output signal of the light receiving signal through said light receiving means; and a calculating means for calculating, when said object detecting means detects the under-measurement object, a distance to the under-measurement object on the basis of a time obtained by subtracting a predetermined time corresponding to a half-value of a pulse width of the light receiving signal from a delay time corresponding to a time difference between a time the pulse beam is generated by the light emitting means and a time at which the light receiving means receives a peak of the light receiving signal.

2. The distance measuring equipment according to claim 1, further comprising:

a clock generating means for generating a clock pulse at a predetermined time interval;

a sample pulse generating means for generating a sample pulse corresponding to each clock pulse at a timing delayed in sequence by a predetermined minute time from a generation timing of each clock pulse during one measuring period in which a predetermined period for generating a plurality of clock pulses is set as a measuring period; and a sample hold means for sampling the light receiving signal from said light receiving means by use of the sample pulse, wherein said light receiving means generates the pulse beam in synchronism with the clock pulse generated from said clock generating means, said object detecting means detects the under-measurement object by comparing a level of the output signal from said sample hold means with a predetermined detection level, and said calculating means calculates a distance to the under-measurement object on the basis of an output signal from said sample hold means and a delay time of the sample pulse.

3. The distance measuring equipment according to claim 2, wherein said calculating means, if a peak of the light receiving signal is undetectable after said object detecting means has detected the under-measurement object, calculates the distance to the under-measurement object on the basis of the delay time from the generation of the pulse beam through said light emitting means when said object detecting means detects the under-measurement object.

4. The distance measuring equipment according to claim 2, wherein said calculating means calculates an inclination of the light receiving signal from a rise over the predetermined detection level to a reach of the peak and, at the same time, calculates, if the calculated inclination is smaller than a predetermined value, a distance to the under-measurement object on the basis of the delay time from the generation of the pulse beam through said light emitting means when said object detecting means detects the under-measurement object.

5. The distance measuring equipment according to claim 1, further comprising an error determining means for comparing the measured distance calculated by said calculating means with a predetermined value and, at the same time, outputting, if the measured distance is smaller than the predetermined value, a result that this measured distance is erroneous.

6. The distance measuring equipment according to claim 1, wherein said calculating means outputs, to the outside, the calculated distance to the under-measurement object.

* * * * *